(12) United States Patent
Eren et al.

(10) Patent No.: US 7,391,338 B2
(45) Date of Patent: Jun. 24, 2008

(54) APPARATUS AND METHOD USING A SENSOR TO DETECT IMPROPER ORIENTATION OF AN OBJECT

(75) Inventors: Selcuk Suat Eren, Chapel Hill, NC (US); Brian Jules Jaeger, Chapel Hill, NC (US); Douglas Alan Law, Chapel Hill, NC (US); Paul Allen Roberts, Raleigh, NC (US); Shawn Konrad Sremaniak, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 411 days.

(21) Appl. No.: 11/314,989

(22) Filed: Dec. 21, 2005

(65) Prior Publication Data

US 2007/0139181 A1  Jun. 21, 2007

(51) Int. Cl.
*G08B 21/00* (2006.01)
(52) U.S. Cl. .............. 340/686.1; 340/572.3; 340/572.2; 340/539.1; 340/539.13; 340/572.1; 340/572.8; 340/684; 340/686.2
(58) Field of Classification Search ............ 340/572.3, 340/539.26, 572.7, 539.1, 539.13, 572.1, 340/572.8, 686.1, 684, 690, 686.2
See application file for complete search history.

(56) References Cited

U.S. PATENT DOCUMENTS

| | | | | |
|---|---|---|---|---|
| 4,745,295 A | * | 5/1988 | Seno et al. ............. | 250/559.26 |
| 5,015,841 A | * | 5/1991 | Hoppmann et al. ..... | 250/223 R |
| 5,597,079 A | * | 1/1997 | Konop ...................... | 212/273 |
| 6,597,384 B1 | * | 7/2003 | Harrison .................... | 345/204 |
| 6,753,783 B2 | | 6/2004 | Friedman et al. ......... | 340/573.7 |
| 7,098,794 B2 | * | 8/2006 | Lindsay et al. ........... | 340/572.3 |
| 7,178,718 B2 | * | 2/2007 | Silverbrook et al. ....... | 235/375 |
| 2003/0227382 A1 | | 12/2003 | Breed ..................... | 340/539.13 |
| 2004/0056779 A1 | * | 3/2004 | Rast ........................... | 340/985 |
| 2004/0085192 A1 | | 5/2004 | Hartmann .................. | 340/10.4 |
| 2004/0095241 A1 | | 5/2004 | Maloney ................... | 340/568.1 |
| 2004/0102869 A1 | | 5/2004 | Andersen et al. ............ | 700/215 |

(Continued)

*Primary Examiner*—Daryl C. Pope
(74) *Attorney, Agent, or Firm*—Duke W. Yee; Gregory M. Doudnikoff; James O. Skarsten

(57) ABSTRACT

Apparatus and method is provided for using low cost, passive RF sensor technology such as RFID tags, to determine whether containers or other objects are in a right-side-up orientation. A useful embodiment of the invention is directed to sensor apparatus for use in detecting an improper orientation of a conventional box or container with respect to a substantially horizontal surface. The apparatus includes a structure having two sides formed of plastic in spaced apart relationship, to define an enclosed space within the structure. Selected shielding material attached to the structure shields a specified region of the enclosed space against RF signals, the shielded region being located in the lowest portion of the enclosed space when the structure is in a reference orientation with respect to the horizontal surface. An RFID tag embedded in a disk is positioned in the enclosed space, the disk being sized to move freely within the space. A guide element guides the disk in moving between the shielded region and an unshielded region, when the structure is correspondingly moved between its reference orientation and an improper orientation corresponding to an improper orientation of the container. This allows a signal to be received from the RFID tag when it becomes unshielded, to indicate improper container orientation.

20 Claims, 4 Drawing Sheets

U.S. PATENT DOCUMENTS

| | | | |
|---|---|---|---|
| 2004/0124235 A1 | 7/2004 | White et al. | 229/125.34 |
| 2004/0150387 A1 | 8/2004 | Lyon et al. | 324/127 |
| 2004/0189474 A1 | 9/2004 | Borovoy et al. | 340/573.1 |
| 2004/0189476 A1 | 9/2004 | Borovoy et al. | 340/573.1 |
| 2004/0193413 A1 | 9/2004 | Wilson et al. | 704/243 |
| 2004/0260506 A1 | 12/2004 | Jones et al. | 702/150 |
| 2005/0055254 A1 | 3/2005 | Schmidtberg et al. | 705/7 |
| 2007/0013521 A1* | 1/2007 | Lindsay et al. | 340/572.1 |

* cited by examiner

180° ROTATION

270° CLOCKWISE

US 7,391,338 B2

APPARATUS AND METHOD USING A SENSOR TO DETECT IMPROPER ORIENTATION OF AN OBJECT

BACKGROUND OF THE INVENTION

1. Field of the Invention

The invention disclosed and claimed herein generally pertains to an apparatus and method that uses a passive or active sensor, such as a low-cost RF Identification (RFID) tag, to determine that a specified object is not in a correct or proper orientation. More particularly, the invention pertains to apparatus of the above type for use with shipping containers and the like, to readily determine that a container is not in a "right-side-up" orientation. It is anticipated that embodiments of the invention will be useful for detecting improper container orientation in warehouses or other environments in which it is difficult or time consuming to visually inspect the orientations of individual containers.

2. Description of the Related Art

As is well known, conventional cartons or containers, of a type widely used to pack, ship and store products of many different kinds, typically have six rectangular sides. Each of the sides is in substantially orthogonal relationship with every other side with which it shares a common edge. As is further well known, it is very common to designate one of the sides of such containers as the top side, and the opposing side as the bottom side. Moreover, it may be important to maintain the container in a "right-side-up" orientation. In such orientation, the top side of the container is directed upward, and the bottom side is conversely directed downward. This may be necessary to prevent damage or to ensure safety. For example, a container may be used to hold comparatively fragile products, such as computer equipment or other electronic components. To protect the product if the container is unintentionally dropped, substantial cushioning material could be placed between the product and the bottom side of the container. However, if the container is not kept in a right-side-up orientation, the benefit of the cushioning placed along its bottom side would be substantially reduced.

Notwithstanding the importance of proper orientation, it may frequently be quite difficult to determine whether a box or container, as it is being stored or shipped, is in fact correctly oriented. This situation is often encountered in high volume package environments, such as warehouses, manufacturing facilities and transport vehicles. In these types of environments, it may be difficult or impossible to visually inspect every side of a container, or to detect orientation markings printed thereon. Accordingly, it would be beneficial to provide container handlers and others with improved non-visual means for readily detecting improper orientation of containers or boxes.

BRIEF SUMMARY OF THE INVENTION

The invention provides an apparatus and method for using low cost, RF sensor technology, such as RFID tags or devices, to determine whether or not containers or other objects are in a right-side-up orientation. In a useful embodiment, a standard passive RFID tag is affixed to a disk contained in a flat structure. The disk is directed into a shielded region, when an attached box or container is oriented properly. When the box or container is in any other orientation orthogonal to the proper orientation, the disk becomes unshielded. This allows a signal to be received from the RFID tag, to indicate that the box is not properly oriented. A further embodiment of the invention is directed to sensor apparatus for use in detecting an improper orientation of a container or other object with respect to a substantially horizontal surface. The apparatus includes a structure having sides in spaced apart relationship, to define an enclosed space within the structure. Selected shielding material attached to the structure shields a specified region of the enclosed space against RF signals, the shielded region being located in the lowest portion of the enclosed space when the structure is in a reference orientation with respect to the horizontal surface. An RF sensor device is positioned in the enclosed space, the RF sensor device being sized to move freely within the space. A guide element mounted in the space guides the RF sensor device in moving between a shielded region and an unshielded region of the space, when the structure is correspondingly moved between its reference orientation and an improper orientation corresponding to an improper orientation of the object.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
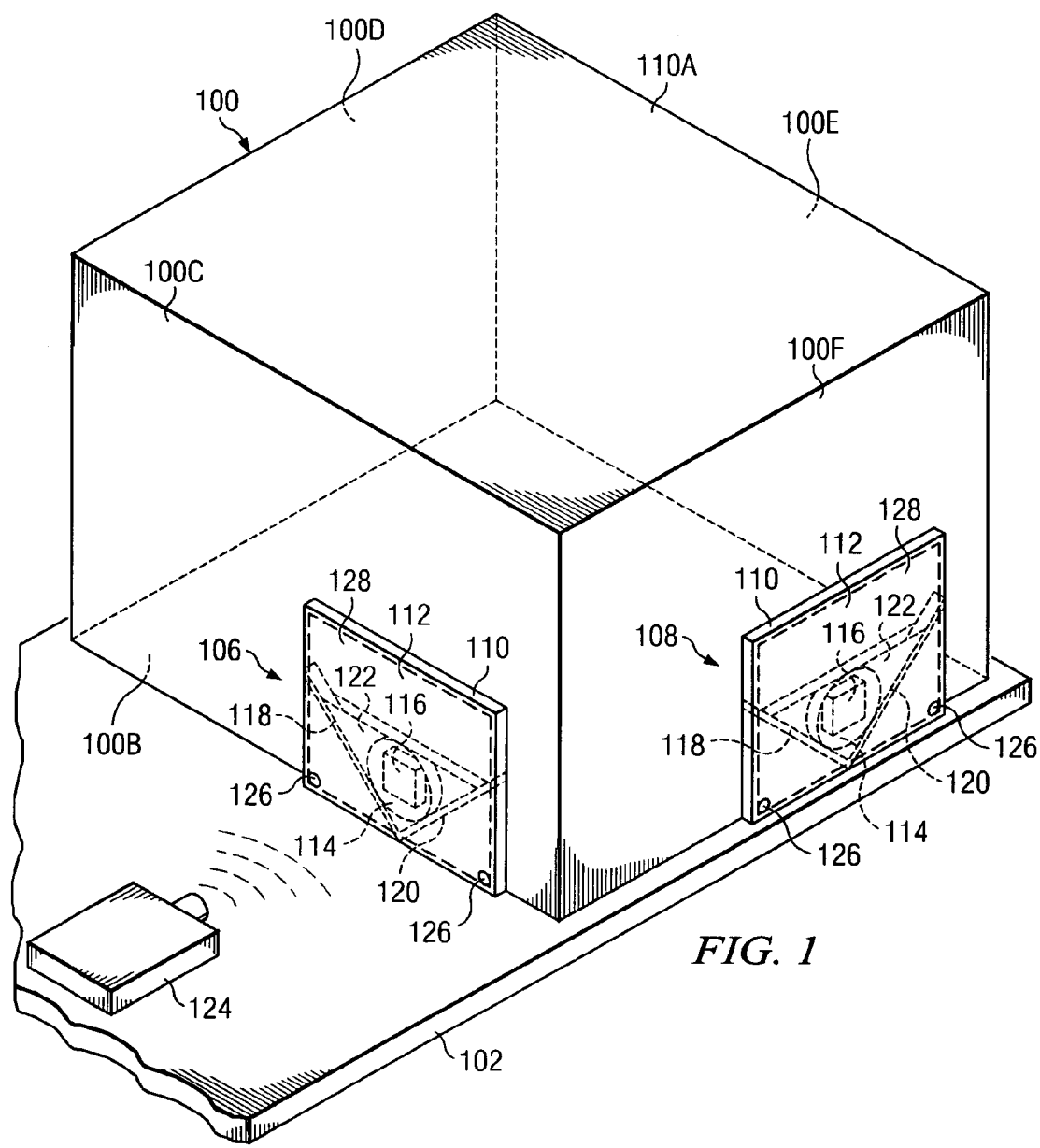
FIG. 1 is a perspective view showing orientation sensors constructed in accordance with the invention.

Referring to FIG. 1, there is shown a conventional six-sided shipping container, carton or box 100, supported upon a substantially horizontal support surface 102. More particularly, container 100 comprises six rectangular-shaped sides or panels 100A-100F, wherein each side is in substantially orthogonal relationship with each adjacent side, that is, with each side with which it has a common edge. Side 100A is the top side of container 100, and side 100B is the bottom side thereof. Thus, all the force received from surface 102 to support container 100 is received through bottom side 100B. FIG. 1 further shows sides 100C-100F respectively extending between top side 100A and bottom side 100B. Bottom side 100B shares common edges with each of the sides 100C-100F, and is thus respectively adjacent thereto.

Horizontal support surface 102 may comprise, for example, a floor or a load carrying shelf in a warehouse, or the bed of a truck provided to transport container 100. Surface 102 may also be the top sides of one or more other containers that container 100 has been stacked upon. Regardless of the nature of horizontal surface 102, it will frequently be very important to place and maintain container 100 on surface 102 so that container 100 is right side up. In such orientation, top side 100A is the uppermost side of container 100, and bottom side 100B is in contact with horizontal surface 102. This is the orientation shown in FIG. 1.

Referring further to FIG. 1, there are shown orientation sensors 106 and 108, each comprising an embodiment of the invention, respectively attached to adjacent sides 100C and 100F of container 100. Sensors 106 and 108 are shown attached to the outside of container 100, to avoid interfering with any product or items (not shown) that may be placed within container 100. Alternatively, one or both of the orientation sensors could be attached to their respective sides within container 100, to protect the sensors when container 100 is being handled. This mode of attachment would also prevent tampering with sensors 106 and 108.

FIG. 1 shows orientation sensor 106 comprising a comparatively flat chamber or other structure 110, that contains a narrow enclosed space 112. A disk 114, formed of plastic or other suitable material that will readily occur to those of skill in the art, is placed within the space 112. Disk 114 serves as a holder or carrier for an RFID tag 116 that is encased or embedded in the disk 114. Disk 114 is sized to provide clearance between the sides of disk 114 and surfaces of structure 110 that serve to define boundaries of space 112. By providing such clearance, disk 114 and its RFID tag 116 are able to move freely within enclosed space 112.

FIG. 1 further shows two linear members 118 and 120 contained in space 112 of structure 110, the two members being joined together to form a "V" configuration. The linear members 118 and 120 are shown to incline downwardly toward the bottom of space 112, as viewed in FIG. 1. Thus, the "V" formed by linear members 118 and 120 serves as a guide element for disk 114, to guide the disk to the lower portion of space 112 when structure 110 is oriented as shown in FIG. 1. This orientation is referred to herein as the reference orientation of structure 110. Disk 114, when positioned between the two linear members near the point of the "V" formed thereby, is referred to herein as being in its home position.

FIG. 1 further shows metal foil or other RF shielding material attached to structure 110, to define a shielded region 122 of enclosed space 112. Dimensions of the shielded region 122 are selected to ensure that disk 114 and RFID tag 116 are entirely within the shielded region 122, whenever disk 114 is in its home position. Thus, whenever RFID tag 116 is in such position, it is prevented by the shielding material from either detecting or responding to RF signal transmissions. For example, FIG. 1 shows an RF reader 124, comprising an antenna and an RF transceiver, positioned to project RF signals toward container 100. RFID tag 116 cannot detect these signals while in its home position.

Orientation sensor 108 is substantially identical to sensor 106, but is attached to side 100F, orthogonal to side 100C. Thus, orientation sensor 108 likewise comprises a structure 110 provided with an enclosed space 112. The enclosed space of sensor 108 similarly contains linear members 118 and 120 forming a "V", and further contains a movable disk 114 having an RFID tag 116 embedded therein. The disk resides in a home position defined by the linear members when the sensor 108 is in its reference orientation as shown by FIG. 1. Shielding material attached to the structure 110 of sensor 108 prevents its RFID tag 116 from detecting RF transmissions, when such device 116 is in the home position.

It will be readily apparent that container 100 could be placed on horizontal surface 102 in any of six orientations. That is, any of the six sides 100A-100F of container 100 could be placed downward, in contact with surface 102. However, only one of these orientations is correct or proper, namely, the orientation in which side 100B is the downward side. Accordingly, the orientation sensors 106 and 108 have been designed so that their respective disks 114 will each be in the home position when side 100B is the downward side, as shown in FIG. 1. However, if container 100 is oriented so that any of its sides 100A or 100C-100F is the downward side, the disk 114 of one or both of the orientation sensors will roll out from the shielded region 122, into an unshielded region 128 of enclosed space 112. When this occurs, the RFID tag 116 in the disk 114 is enabled to detect RF signals.

It is important to emphasize that in order for the orientation sensors 106 and 108 to operate as described herein, they must both be attached to container 100 so that their respective structures 110 are in their reference orientations when side 100B is downward. As indicated above, the structure of each orientation sensor is in its reference position when the point of the "V" formed by linear members 118 and 120 points directly downward, as shown by FIG. 1. In this orientation, the "V" acts to guide disk 114 to the lower portion of space 112 and into shielded region 122.

To assist a user in correctly attaching the orientation sensors to a container 100, each sensor is usefully provided with visual indicia, such as two red dots 126 positioned along the lower edge of structure 110. When attaching an orientation sensor to container 100, the user would ensure that the edge with the red dots was the downward edge of the sensor, when side 100B was the downward side of container 100.

While FIG. 1 shows an embodiment of the invention directed to a container having six rectangular sides, it is to be emphasized that embodiments of the invention can be used with other types of containers as well, such as drums and pyramid type containers. In fact, embodiments of the invention can be used to detect improper orientation of a wide range of container types, as well as other objects that have two or more possible orientations. The principal requirement for use of the invention is that such containers and other objects must have only one orientation that is proper (or only one orientation that is improper).

Figure 2:
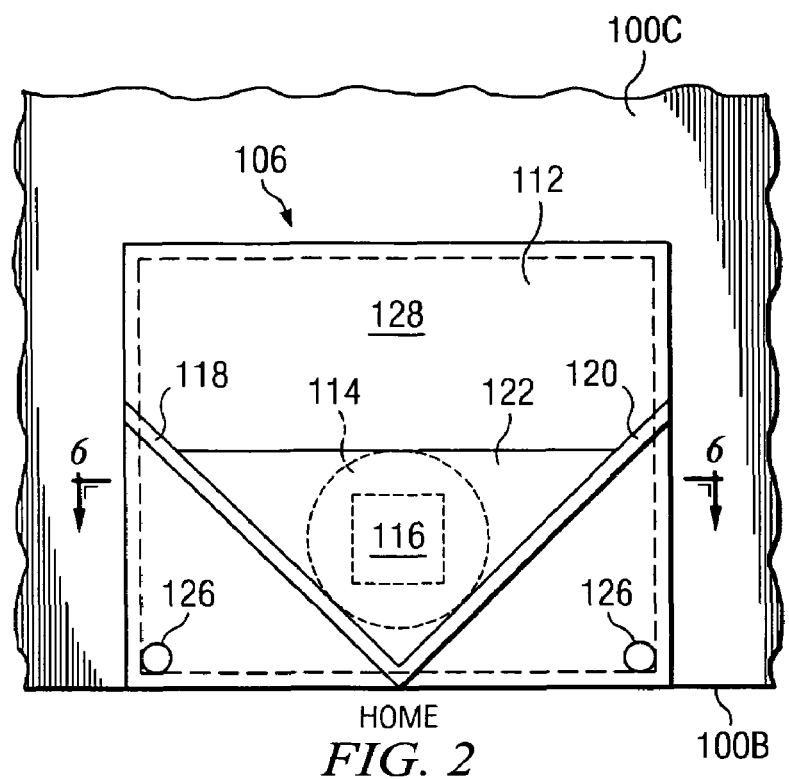
FIGS. 2-5 are views respectively showing an orientation sensor of FIG. 1 in different positions, to illustrate the operation thereof.

Referring to FIG. 2, there is shown sensor 106 in its reference orientation, so that disk 114 is in the home position. As described above, this occurs when side 100B of container 100 is placed downward, in contact with surface 102. As likewise described above, in this position RFID tag 116 resides in shielded region 122 of enclosed space 112.

Figure 3:
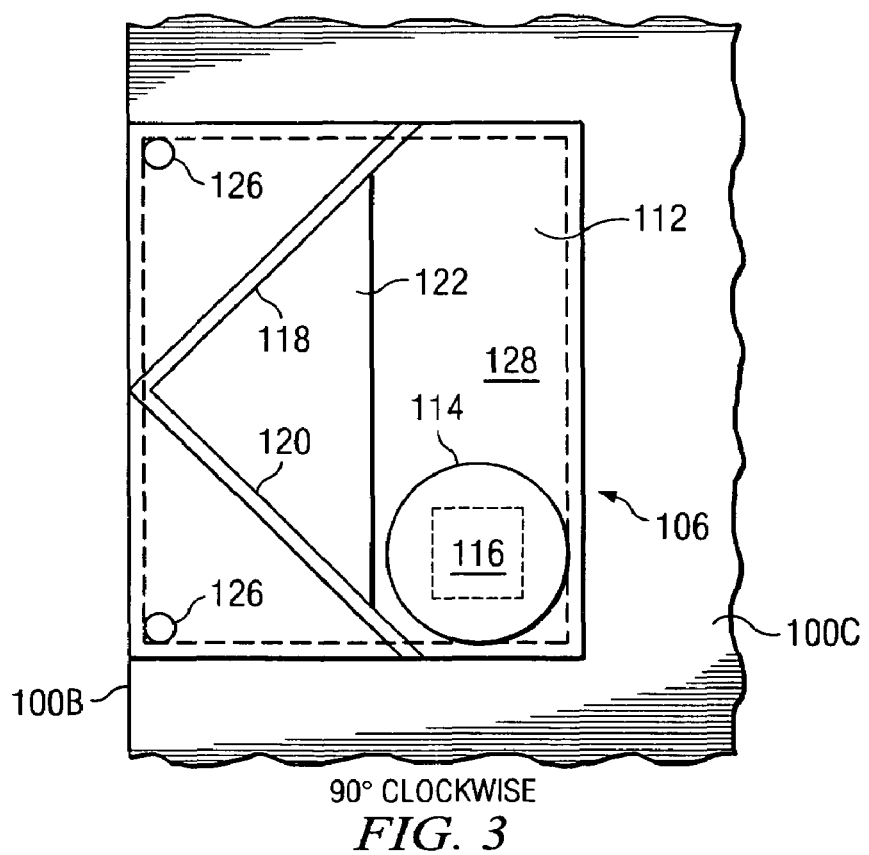

Referring to FIG. 3, there is shown orientation sensor 106 when container 100 is oriented so that its side 100D is the downward side in contact with surface 102. In this orientation of the container, sensor 106 is rotated 90 degrees clockwise from its reference orientation. FIG. 3 shows that linear member 120 now inclines downwardly, away from shielded region 122. Accordingly, disk 114 rolls down member 120 into unshielded region 128 of enclosed space 112. This enables RFID tag 116 to detect RF signals.

Figure 4:
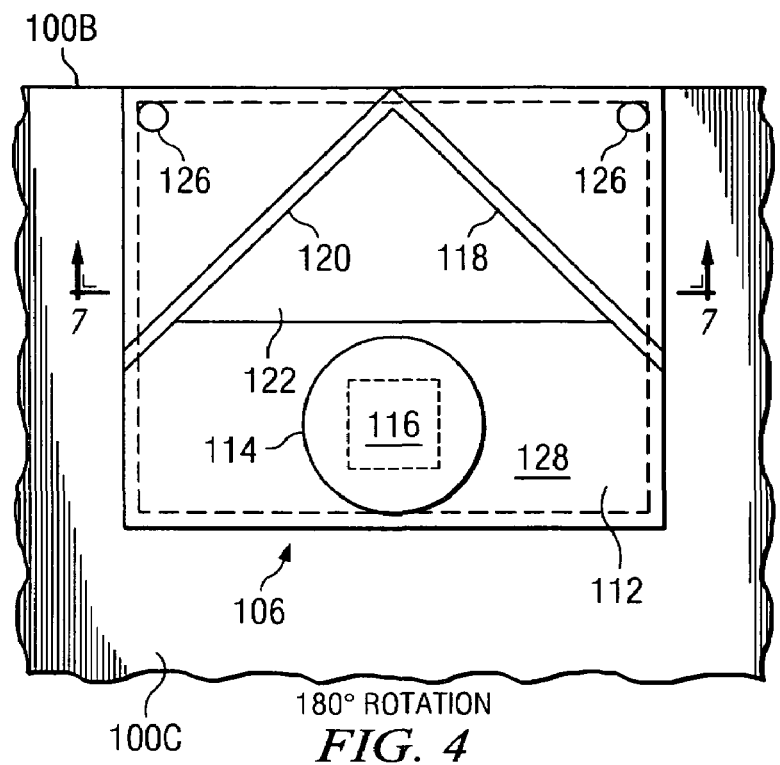

Referring to FIG. 4, there is shown orientation sensor 106, when container 100 is oriented so that its side 100A is the downward side in contact with surface 102. In this orientation of the container, sensor 106 is rotated 180 degrees from its reference orientation. As shown by FIG. 4, in this position disk 114 is pulled downwardly by gravity and out of shielded region 122 into unshielded region 128 of enclosed space 112. This enables RFID tag 116 to detect RF signals. While not shown, the disk 114 of orientation sensor 108 would also move downwardly, from the shielded region to the unshielded region of such sensor.

Figure 5:
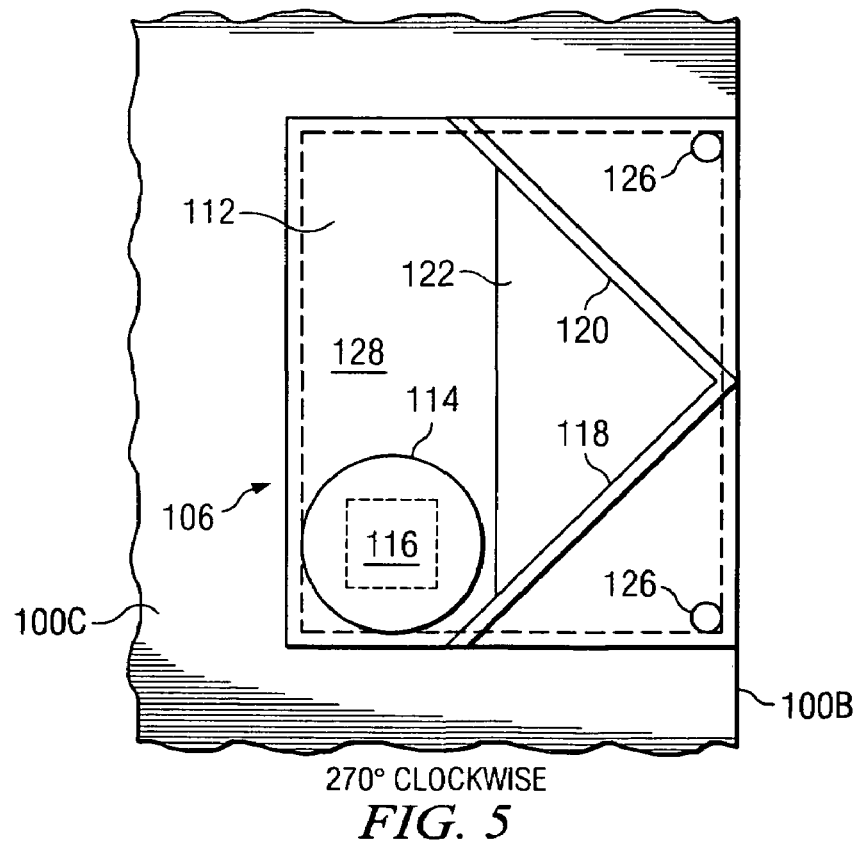

Referring to FIG. 5, there is shown sensor 106 when container 100 is oriented so that its side 100F is the downward side in contact with surface 102. In this orientation of the container, sensor 106 is rotated 270 degrees clockwise from its reference orientation. FIG. 5 shows that linear member 118 now inclines downwardly away from shielded region 122. Accordingly, disk 114 rolls down member 118 into unshielded region 128, enabling RFID tag 116 to detect RF signals.

While not shown, if container 100 was oriented so that side 100E was the downward side in contact with the surface 102, orientation sensor 108 would be rotated 90 degrees clockwise from its position in FIG. 1. Accordingly, disk 114 of sensor 108 would move from its shielded region 122 to its unshielded region 128 in the manner described above. Moreover, if side 100C became the downward side in contact with surface 102, sensor 108 would be rotated 90 degrees counterclockwise, or 270 degrees clockwise, from its position shown in FIG. 1. This would again result in disk 114 of orientation sensor 108 moving from the shielded region 122 to the unshielded region 128 thereof.

It is seen from the above that for each of the six possible orientations of container 100, the RFID tags 116 of both orientation sensors 106 and 108 remain shielded from RF signals only when side 100B is the downward side, as desired. When container 100 is in any of the other orientations, the RFID tag 116 of at least one of the sensors will be in its unshielded region 128. Thus, improper orientation may be readily detected, by operating reader 124 to project an RF signal to container 100. If an RFID tag 116 is unshielded, it will detect the signal, and transmit an identity code back to reader 124 in response. Accordingly, any RF transmission back to the reader from a tag 116 provides notice that container 100 is not in its proper orientation. It is to be noted that both of the orientation sensors 106 and 108 are necessary, in order to detect all possible improper orientations of the container 100.

In the embodiment described above, RFID tag 116 functions as a passive device, in responding to signals projected from reader 124. In other embodiments, an active RF device could be substituted for RFID tag 116. Such active device could project an RF signal to a detector at some distance from a container, to indicate improper orientation of the container.

Figure 6:
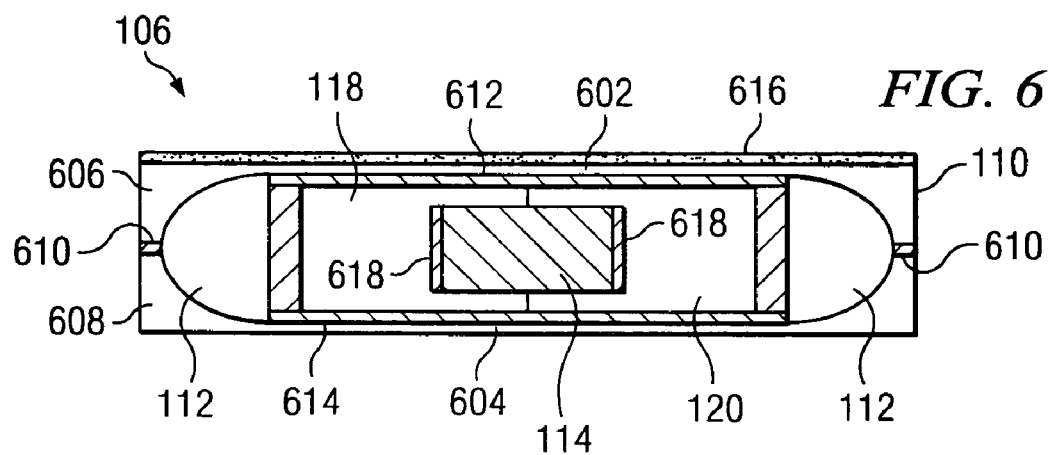
FIG. 6 is a sectional view taken along line 6-6 of FIG. 2.

Referring to FIG. 6, there is shown structure 110 of sensor 106 formed by joining layers or sheets of plastic 602 and 604 around their respective edges. Usefully, the two sheets have the same length and width dimensions, and each sheet has a raised edge or lip extending around its perimeter, on one of its sides. FIG. 6 shows sheets 602 and 604, which may be clear or opaque, provided with raised edges 606 and 608, respectively. To provide enclosed space 112, the raised edges 606 and 608 are bonded together, such as by means of an adhesive 610.

Referring further to FIG. 6, there are shown linear members 118 and 120 and disk 114 contained in enclosed space 112, as described above. Members 118 and 120 extend across the width of enclosed space 112, for most effective RF shielding. Layers of metal foil 612 and 614, or other suitable RF shielding material, are attached to plastic sheets 602 and 604, respectively. The shielding layers provide shielded region 122 of enclosed space 112, as likewise described above. To further enhance RF shielding, layers 612 and 614 are placed on the inner sides of sheets 602 and 604, between the sheets and linear guide members 118 and 120. To enable orientation sensor 106 to be readily attached to a container, a layer of adhesive 616 is applied to one of the sides of the sensor.

FIG. 6 further shows the edge of disk 114 covered with a coating or layer of RF shielding material 618. This acts to prevent RF signal from penetrating the unshielded region 122.

Figure 7:
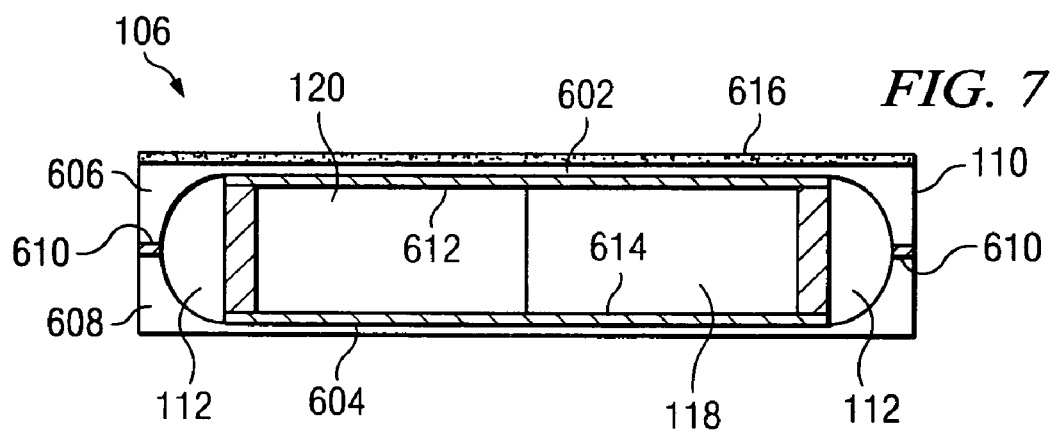
FIG. 7 is a sectional view taken along line 7-7 of FIG. 4.

FIG. 7 shows a view of orientation sensor 106 that is similar to the view of FIG. 6. However, in FIG. 7 the disk 114, having moved into the unshielded region of enclosed space 112, is not shown.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. Sensor apparatus for use in detecting an improper orientation of an object with respect to a substantially horizontal surface, said apparatus comprising:
   a structure having sides in spaced apart relationship to define an enclosed space;
   selected material attached to said structure to shield a specified region of said enclosed space from RF signals, said shielded region being located in the lowest portion of said enclosed space when said structure is in a reference orientation with respect to said horizontal surface;
   an RF sensor device positioned in said enclosed space, said RF sensor device being sized to move freely within said space; and
   a guide element mounted in said space to guide said RF sensor device in moving between said shielded region and an unshielded region of said space, when said structure is correspondingly moved between said reference orientation and an improper orientation corresponding to an improper orientation of said object.

2. The apparatus of claim 1, wherein:
   said guide element comprises two linear members, each of said linear members residing partially in said shielded region and partially in said unshielded region of said enclosed space, said linear members being joined together within said shielded region to form a "V" configuration, said "V" configuration being positioned within said enclosed space so that both of said linear members incline downwardly into said shielded region, when said structure is positioned in said reference orientation, and at least one of said linear members inclines downwardly into said unshielded region, when said structure is positioned in an improper orientation.

3. The apparatus of claim 1, wherein:
   said RF sensor device is adapted to move downwardly along an incline provided by said guide element.

4. The apparatus of claim 3, wherein:
   said RF sensor device comprises an RFID tag supportably contained within a carrying device.

5. The apparatus of claim 4, wherein:
   said carrying device comprises a circular disk disposed to roll downward along a downwardly inclined linear member.

6. The apparatus of claim 3, wherein:
   said apparatus includes means for fixably attaching said structure to said object, so that said structure is in said reference orientation when said object is in a proper orientation with respect to said horizontal surface.

7. The apparatus of claim 6, wherein:
   said sides of said structure respectively comprise sheets of plastic material bonded together proximate to their respective edges, and said attaching means comprises a layer of adhesive material applied to an outer side of one of said plastic sheets.

8. The apparatus of claim 3, wherein:
   said object comprises a six sided container, each side comprising a rectangular-shaped panel in substantially orthogonal relationship with each side adjacent thereto, one of the container sides being designated as the bottom side, and said apparatus includes means for attaching said structure to said container so that said structure is in said reference orientation when said bottom side is positioned to be the lowest side of said container.

9. The apparatus of claim 8, wherein:
said apparatus comprises a first apparatus that is substantially identical to a second apparatus, said first apparatus and said second apparatus being respectively attached to adjacent sides of said container, wherein said adjacent sides are in orthogonal relationship with one another and with said bottom side.

10. The apparatus of claim 4, wherein:
said RFID tag is detectable by an RF reader when said RFID tag and said carrying device are in said unshielded region, and are undetectable when said RFID tag and said carrying device are in said shielded region.

11. Sensor apparatus for detecting an improper orientation of a container having sides in orthogonal relationship with one another, wherein every orientation of said container is improper except for a pre-specified right-side-up orientation, said apparatus comprising:
layers of specified material joined together to form a structure having an enclosed space;
shielding material attached to said structure to shield a specified region of said enclosed space from RF signals, while leaving the remainder of said enclosed space as an unshielded region;
an RF sensor device positioned in said enclosed space, said RF sensor device being sized to move freely within said space;
means for attaching said structure to a selected side of said container, so that said shielded region of said enclosed space will be below said unshielded region when said container is in its right-side-up orientation; and
a guide element mounted in said space to urge said RF sensor device to move between said shielded region and said unshielded region, when said container is correspondingly moved between said right-side-up orientation and an improper orientation.

12. The apparatus of claim 11, wherein:
said apparatus includes an RF transceiver device for projecting RF signals toward said structure, wherein a signal sent back to said transceiver by said RF sensor device, in response to one of said projected signals, provides notice of an improper orientation of said container.

13. The apparatus of claim 12, wherein:
said guide element comprises two linear members, both of said linear members inclining downwardly into said shielded region when said container is in said right-side-up orientation, and at least one of said linear members inclining downwardly into said unshielded region when said container is in an improper orientation.

14. The apparatus of claim 13, wherein:
said RF sensor device comprises an RFID tag, supportably contained within a circular disk disposed to roll downward along a downwardly inclined linear member.

15. The apparatus of claim 14, wherein:
said apparatus comprises a first orientation sensor, and a substantially identical second orientation sensor is attached to a side of said container that is orthogonal to said selected side.

16. A method for detecting an improper orientation of a container having sides in orthogonal relationship with one another, wherein every orientation of said container is improper except for a pre-specified right-side-up orientation, said method comprising the steps of:
attaching shielding material to a structure having an enclosed space to shield a specified region of said enclosed space from RF signals, while leaving the remainder of said enclosed space as an unshielded region;
positioning an RF sensor device in said enclosed space, said RF sensor device being sized to move freely within said space;
attaching said structure to a selected side of said container, so that said shielded region of said enclosed space will be below said unshielded region when said container is in its right side up orientation; and
guiding said RF sensor device to move between said shielded region and said unshielded region, when said container is correspondingly moved between said right-side-up orientation and an improper orientation.

17. The method of claim 16, wherein:
said method further includes operating an RF transceiver device to project RF signals toward said structure, wherein a signal is sent back to said transceiver by said RF sensor device in response to one of said projected signals, to provide notice of an improper orientation of said container.

18. The method of claim 17, wherein:
said RF sensor device is moved downwardly along an incline into said shielded region, when said container is in said right-side-up orientation, and is moved downwardly into said unshielded region, when said container is in an improper orientation.

19. The method of claim 18, wherein:
said RF sensor device comprises an RFID tag, supportably contained within a circular disk disposed to roll downward along a downwardly inclined linear member fixably mounted in said enclosed space.

20. The method of claim 19, wherein:
said structure is attached to said selected side of said container by means of an adhesive material applied to an outer side of said structure.

* * * * *